United States Patent
Hersom et al.

[11] Patent Number: 6,066,850
[45] Date of Patent: *May 23, 2000

[54] SATELLITE ATTITUDE SENSOR USING THERMAL IMAGING

[75] Inventors: Charles Hersom, Toronto, Canada; Zvika Afik, Tel Aviv, Israel; Allan Hollinger, North York; Paul J. Thomas, East York, both of Canada

[73] Assignees: Canadian Space Agency, Saint-Hubert; Centre for Research in Earth and Space Technology, North York; Thomson-CSF Optronics Canada Inc., St. Laurent, all of Canada

[*] Notice: This patent is subject to a terminal disclaimer.

[21] Appl. No.: 08/946,702

[22] Filed: Oct. 8, 1997

Related U.S. Application Data

[63] Continuation-in-part of application No. 08/710,308, Sep. 17, 1996, Pat. No. 5,721,431.

[51] Int. Cl.[7] ........................................................ G01J 5/06
[52] U.S. Cl. ...................... 250/342; 250/340; 250/338.4; 250/338.1; 244/158 R
[58] Field of Search ................................... 250/342, 340, 250/338.4, 338.1; 244/158 R

[56] References Cited

U.S. PATENT DOCUMENTS

| | | | |
|---|---|---|---|
| 3,551,681 | 12/1970 | Astheimer | 250/349 |
| 3,936,629 | 2/1976 | Desvignes . | |
| 4,257,106 | 3/1981 | Aver | 250/338.1 |
| 4,785,169 | 11/1988 | Gontin . | |
| 5,142,150 | 8/1992 | Sparvieri | 250/336.2 |
| 5,160,842 | 11/1992 | Johnson | 250/342 |
| 5,477,052 | 12/1995 | Doctor . | |
| 5,585,633 | 12/1996 | Tulet | 250/349 |
| 5,721,431 | 2/1998 | Hersom et al. | 250/342 |
| 5,831,266 | 11/1998 | Jerominek et al. | 250/338.1 |

FOREIGN PATENT DOCUMENTS

| | | |
|---|---|---|
| 2353043 | 5/1976 | France . |
| 2533883 | 4/1984 | France . |

*Primary Examiner*—Constantine Hannaher
*Assistant Examiner*—Andrew Israel
*Attorney, Agent, or Firm*—Lynn C. Schumacher; Nancy E. Hill; Hill & Schumacher

[57] ABSTRACT

The present invention provides a method for distinguishing a boundary of an object, and the object itself, from its background. In the method electromagnetic radiation is detected from at least one field of view substantially spanning the boundary of the object and background adjacent to the boundary and superimposed or overlaid as images onto a detector. The method includes correlating spatial transitions in intensity of the overlaid images on the detector with a boundary of the object. When used for determining the attitude of a satellite with respect to the earth, the detector is a thermal infrared detector thereby providing a sharp contrast between the thermal emission of the earth and cold space. The invention provides a simple, effective method and device for determining satellite orientation and/or attitude with respect to a thermal infrared-emitting target body. The sensor includes a segmented limb-looking mirror to provide multiple fields-of-view within the field-of-regard and superimposing these fields-of-view as images onto a common detector. The required resolution can be obtained while providing a wide range of operational orbital altitudes. The attitude of the satellite can vary by a large angle from the minimal orientation while still permitting an accurate determination of attitude. Multiple channels in a modular form provide redundancy, improved accuracy, and the opportunity of providing more diverse configurations. The utilization of uncooled microbolometer arrays as imaging detectors removes the requirement for additional cooling equipment thereby providing a low cost, small size and low mass sensor with configurational flexibility and no moving parts.

39 Claims, 13 Drawing Sheets

SATELLITE ATTITUDE SENSOR USING THERMAL IMAGING

CROSS REFERENCE TO RELATED U.S. PATENT APPLICATION

This patent application is a continuation-in-part application of U.S. patent application Ser. No. 08/710,308 filed on Sep. 17, 1996, now U.S. Pat. No. 5,721,431, entitled SATELLITE ATTITUDE SENSOR USING THERMAL IMAGING, which has now been allowed.

FIELD OF THE INVENTION

The present invention relates to a method and apparatus for orientation and attitude determination of satellites using overlay of images onto a detector capable of providing a spatial sampling of the image in a wide field-of-regard imaging system.

BACKGROUND OF THE INVENTION

Satellite attitude control is traditionally achieved using sensors and actuators to detect orientation errors and provide the necessary control torques to correct the errors. Earth sensors are used to determine the satellite orientation with respect to the earth. Infrared detectors are commonly used to determine the location of the earth's horizon against the cold background of space. Generally, individual photodiodes are employed as the detector(s) along with rotating or scanning mechanisms to allow a periodic sweep of the detector across the space/earth and earth/space boundaries. The centre of the earth is determined as the midpoint between the two horizon transitions.

Satellites are typically stabilized so that their axes have a known relationship with earth to facilitate such activities as earth observation and communication with ground terminals. Certain types of satellites are stabilized by spinning about one of their axes while other types are three-axis controlled so that the orientation of the satellite is maintained as required. Earth sensors are used for both applications and most geosynchronous satellites use spin stabilization at least during the transfer orbit phase prior to deployment on station. In order to satisfy both stabilization scenarios, these satellites usually carry two completely different sets of equipment including both earth and sun sensors. The need for two completely different types of equipment is a major drawback in satellite design because of the added mass.

U.S. Pat. No. 3,551,681 issued to Astheimer is directed to a non-scanning position indicator having at least two separate radiometric cells or detectors each comprising an objective lens, a triangular field mask located in the focal plane of the objective lens, a field lens and a radiation detector. Each separate telescope or cell gathers infrared radiation from two essentially identical fields of view that are from essentially the same region of the earth-space boundary with one of the radiometric cells inverted with respect to the other. The output voltages of the two separate detectors A and B are then electronically ratioed to provide a signal which is linearly proportional to a horizon position. The use of moving parts, namely mechanical choppers is a further drawback to this device. Another major drawback of present earth horizon sensors is that they are usually designed to operate at a specific orbital altitude and therefore the optics are optimized accordingly.

Therefore, it would be very advantageous to provide a satellite attitude sensor system which can function in both spinning and non-spinning modes, which can operate over a wide range of altitudes while still maintaining the required resolution, which is compact, modular, lightweight and does not rely on moving parts.

SUMMARY OF THE INVENTION

An object of the present invention is to provide an apparatus and method for satellite orientation and attitude control using an optical overlay of thermal images to achieve high resolution while maintaining a wide field-of-regard and thus permitting operation over a wide range of altitude.

Another object of the present invention is to provide a method and apparatus for sensing wildfires on earth from satellites.

Still another object of the present invention is to provide a satellite attitude sensor which can operate as both an earth and sun sensor in a spinning environment and also as the earth sensor in the non-spinning case thereby providing considerable savings in launch mass and overall cost.

The present invention provides a method for distinguishing a boundary of an object from its background. The method comprises focusing electromagnetic radiation from at least one field of view substantially spanning at least a portion of a boundary of an object and background adjacent to the at least a portion of the boundary as an image onto a detection means. The detection means includes a microbolometer having an elongate array of microbolometer elements capable of providing spatial sampling of an image focussed thereon. The method includes determining a boundary of an object from its background from a spatial transition in intensity of an image focused on the detection means.

In another aspect of the invention there is provided a method of determining satellite attitude and orientation with respect to a celestial body. The method comprises superposition of images from multiple fields-of-view of limited extent spanning the celestial object/space boundary onto a common detector. The method includes distinguishing amongst the multiple fields of view so that the celestial body can be located within the total field of regard represented by the multiple fields of view.

The present invention provides a device for distinguishing a boundary of an object from its background comprising a housing and detection means mounted in the housing for detecting electromagnetic radiation. The detection means includes a microbolometer having an elongate array of microbolometer elements for spatial sampling of images focused thereon. The device includes an optical focusing means mounted in the housing for focusing electromagnetic radiation from at least one field of view as an image onto the detection means. The device includes a processing means connected to the detection means for correlating a spatial transition in intensity of an image focused on the detection means with a boundary of an object.

The invention also provides a device for determining satellite orientation and attitude with respect to a celestial body, comprising an effective number of optical modules adapted to be attached to a satellite housing in preselected positions with respect to each other. Each optical module includes a detection means adapted to spatially sample an image focused thereon, a segmented mirror having at least one mirror segment, and a focusing mirror means located with respect to the segmented mirror for receiving images reflected from the at least one mirror segment and focussing the image onto the pixelated detection means. The device includes a processing means connected to the detection means. The processing means is adapted to correlate spatial transitions in intensity of the image focused on the pixelated detection means with a boundary of the celestial body and determining therefrom satellite attitude with respect to the celestial body.

In another aspect of the invention there is provided a device for determining orientation and attitude of a satellite with respect to a celestial body. The device comprises an effective number of optical modules adapted to be attached to a satellite housing in preselected positions with respect to each other, each optical module including a pixelated detection means, optical focusing means mounted in the module for collecting and focusing electromagnetic radiation from at least two fields of view as overlaid images onto the pixelated detection means. The device includes processing means connected to the pixelated detection means for correlating a spatial transition in intensity of the overlaid images with a boundary of the celestial object and determining therefrom satellite attitude and/or orientation with respect to the celestial body.

In a further aspect of the invention there is provided a satellite having a satellite housing and an equipment complement comprising an orientation and attitude sensor for determining satellite orientation and attitude of the satellite with respect to a celestial body. The sensor includes an effective number of optical modules adapted to be attached to the satellite housing in preselected positions with respect to each other. Each optical module includes pixelated detection means and an optical focusing means mounted in the module for collecting and focusing electromagnetic radiation from at least two fields of view as overlaid images onto the pixelated detection means. The sensor includes processing means connected to the pixelated detection means for correlating a spatial transition in intensity of the overlaid images with a boundary of the celestial object and determining therefrom satellite attitude and/or orientation with respect to the celestial body.

The present invention also provides a satellite sensor device for detecting fires on the earth. The device comprises a sensor housing, an infrared detector mounted in the housing for detecting infrared electromagnetic radiation characteristic of fires. The device includes optical focusing means mounted in the sensor housing for superimposing images from at least two fields of view of the earth's surface as overlaid images onto the infrared detector. The overlaid images may have different spectral characteristics. Included is processing means for correlating a spatial transition in intensity of the overlaid images on the infrared detector with a boundary of a region emitting infrared radiation characteristic of fires.

More specifically, the present invention advantageously provides a simple, effective method of, and sensor for, determining satellite orientation and/or attitude with respect to a thermal infrared-emitting target body. The sensor includes a segmented limb-looking mirror to provide multiple fields-of-view within the field-of-regard and superimposing the images from these fields-of-view onto a common detector. The required resolution can be obtained while providing a wide range of operational orbital altitudes. Multiple channels in a modular form provide redundancy, improved accuracy, and the opportunity of providing more diverse configurations. The utilization of uncooled microbolometer arrays as imaging detectors removes the requirement for additional cooling equipment. These features provide for a low cost, small size, low mass sensor with configurational flexibility to meet typical attitude requirements.

The preferred use of uncooled microbolometer arrays as imaging detectors advantageously permits replacement of individual photodiodes by one- or two-dimensional matrices of detector pixels. These can be used to determine the horizon transition location when the earth/space transition area is imaged onto the detector array.

The satellite attitude sensor of the present invention can perform as both the earth and sun sensor in a spinning environment and also as the earth sensor in the non-spinning case. Thus a single sensor can replace dual detector systems typically present in geosynchronous satellites thereby saving launch mass and overall cost. Further advantages and features of the method and device of the present invention will become clear to those skilled in the art upon reading of the description and reviewing the drawings.

BRIEF DESCRIPTION OF THE DRAWINGS

The method and device for distinguishing a celestial object from its background and the specific satellite attitude sensor constructed in accordance therewith, will now be described, by way of example only, reference being had to the accompanying drawings, in which.

DETAILED DESCRIPTION OF THE INVENTION

Figure 1:
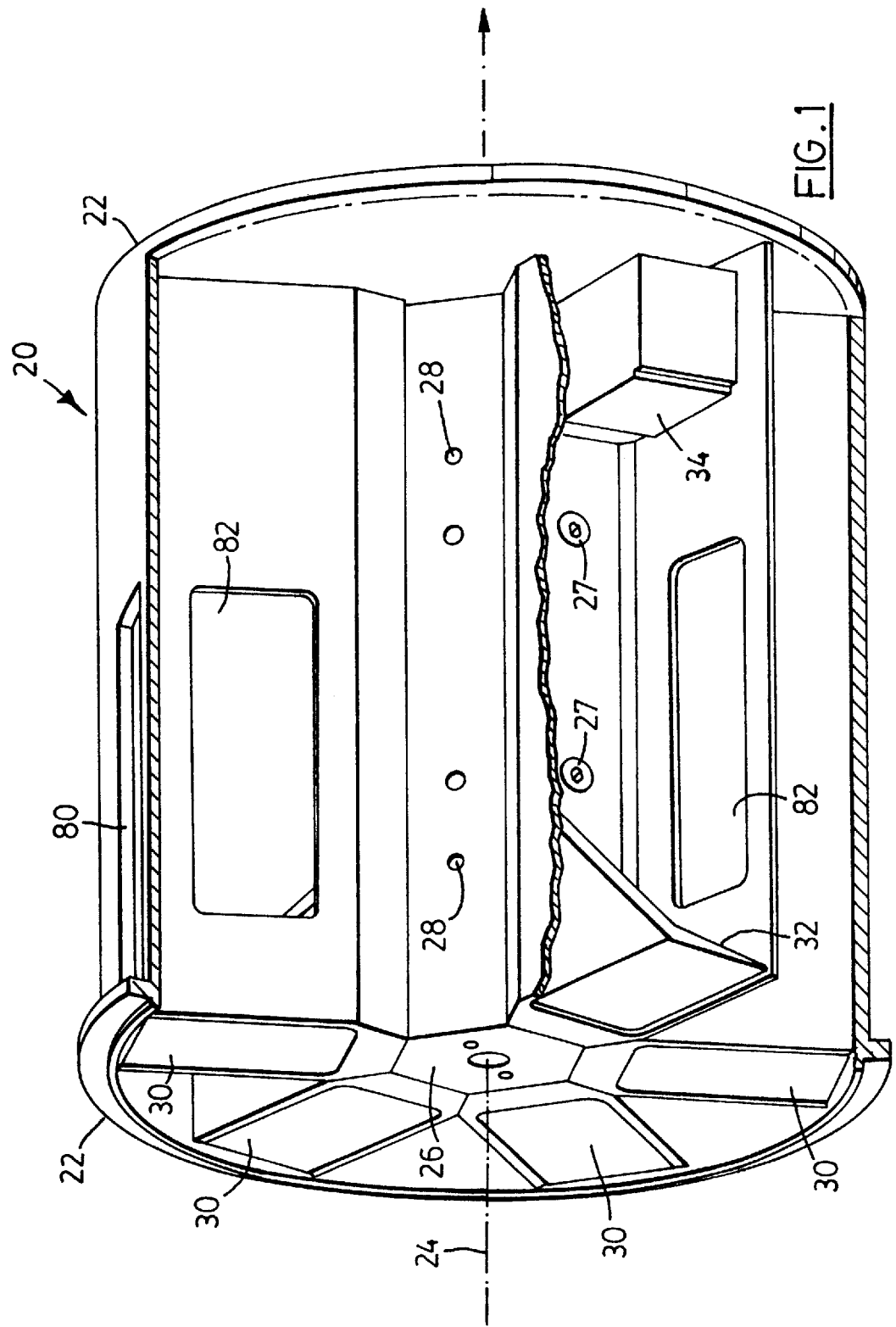
FIG. 1 illustrates a satellite attitude sensor (SAS) constructed in accordance with the present invention provided with multiple optical channels.

Referring first to FIG. 1, a satellite attitude sensor constructed in accordance with the present invention is shown generally at 20. Sensor 20 is provided with a sensor housing 22 fabricated of a strong, light weight material such as aluminum. Titanium, although more expensive than aluminum, may also be used to construct housing 22. Housing 22 defines an axis 24 and includes a mounting pylon 26 with locating pins 28. Sensor 20 is provided with several optical modules 30 disposed about axis 24 and rigidly attached to mounting pylon 26 by bolts 27 with the aid of locating pins 28. Those skilled in the art will appreciate that other types of precision locating and fastening devices may be used in place of pins 28 and bolts 27.

Figure 2:
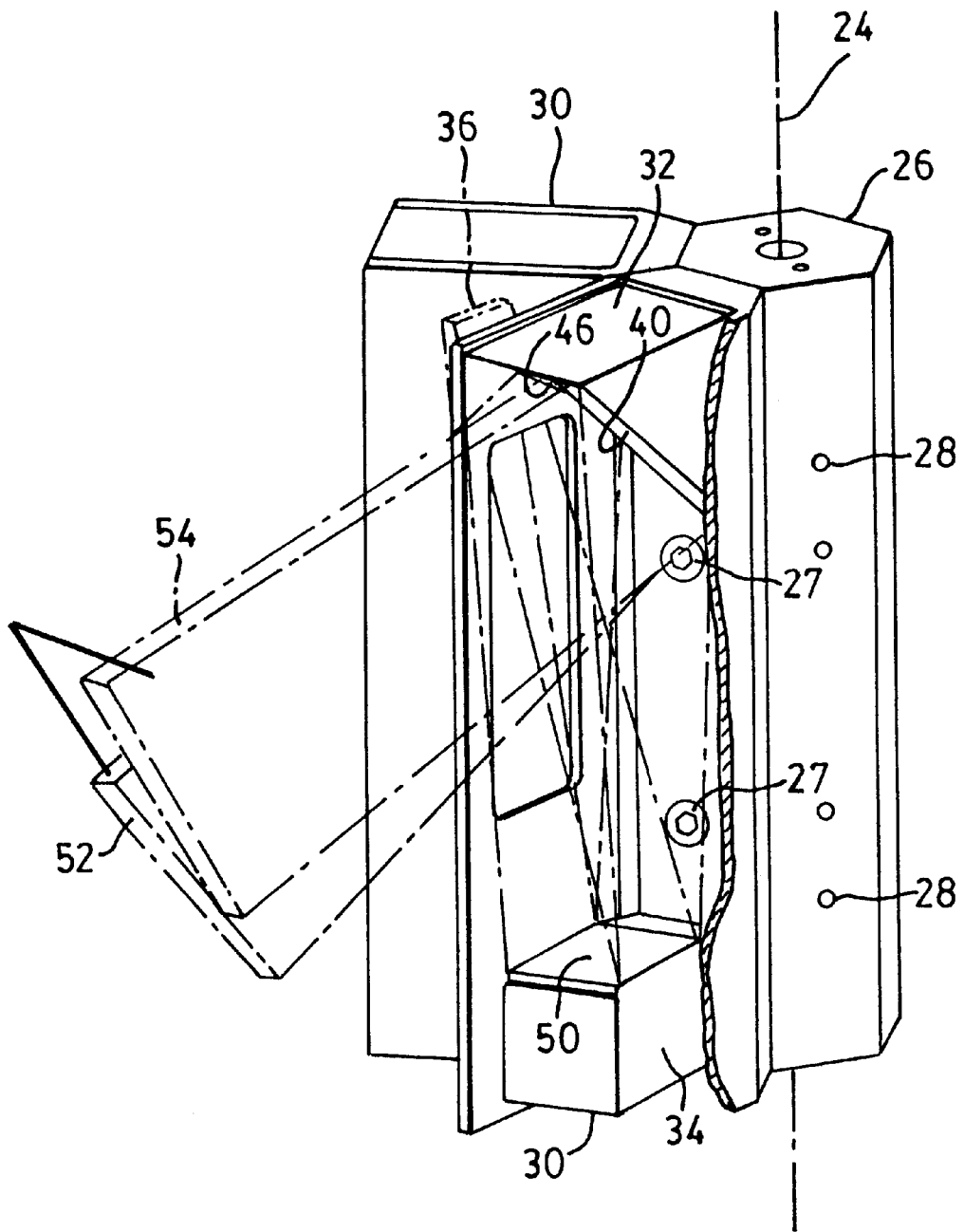
FIG. 2 illustrates the configuration of an optical module of the satellite attitude sensor using reflective optics and a detector.
Figure 3A:
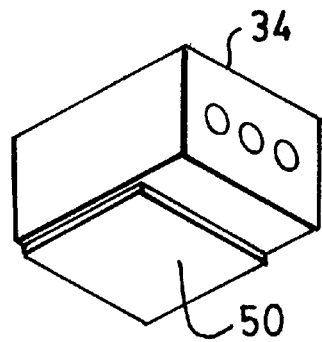
FIG. 3a is an isometric view of a focussing mirror used in the optical module of FIG. 2.
Figure 3B:
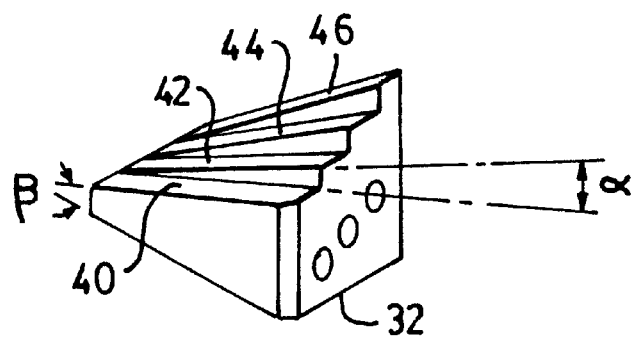
FIG. 3b is an isometric view of a segmented limb-looking mirror used in the optical module of FIG. 2.
Figure 3C:
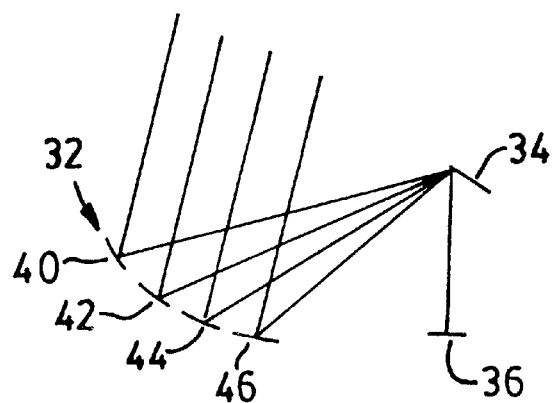
FIG. 3c is a diagrammatic representation of one optical channel which provides four fields-of-view.

Details of the opto-mechanical design of the focusing array are illustrated in FIG. 2 in which two optical modules 30 are shown. Each module 30 comprises a module housing 31 and a limb-looking entrance mirror 32 for receiving images from the celestial body and background region which the satellite is tracking. Also attached to module housing 31 is a focusing mirror 34 onto which the images are reflected from mirror 32, and a detector 36 located at the final image position which receives the input images from mirror 34 in an overlay arrangement. With reference to FIG. 3b segmented limb-looking mirror 32 is provided with four planar reflective mirror segments 40, 42, 44 and 46 in a segmented configuration with a preselected angle a between the reflective plane of each segment. Focusing mirror 34 is provided with a single curved (concave) reflective surface 50 which focuses the four images provided by limb-looking mirror 32 at the final image position on detector 36 (FIG. 2). FIG. 3c shows a diagrammatic representation of one of the optical channels to give four overlaid images.

The optics/detectors are modularized so that each individual module contains its own optics and a detector 36. Detectors 36 are mounted onto a printed circuit board (not shown) at the bottom of each module. Each detector 36 is interfaced with the central processing electronics (not shown) located below the modules in the base of the sensor unit.

The satellite attitude sensor as illustrated in FIG. 1 employs a thermal infrared sensor 36 which detects the earth horizon against the cold background of space. The limb-looking mirror 32 of each optical channel (or module) comprises four flat segments, each segment being rotated with respect to the next segment by a preselected amount in order to direct an adjacent angular region approximately perpendicular to the earth horizon onto the focusing mirror 34. The input radiation to all the mirror segments is focused onto the quasi-linear detector array. Thus each array may have a number of earth overlays. At least one of these overlays will contain the earth-space transition so that a readout of the detector will locate this transition. The amount of earth radiation will readily indicate in which segment the transition occurs. However, with appropriate initialization and an approximate knowledge of the orbital altitude, the location of the transition amongst the multiple fields-of-view in each detector is determinable by the recent history since the transition is expected to shift much more slowly than the sampling rate of the detectors.

In order to obtain two axes of attitude information, two optical modules can be used but a degeneracy is evident unless there is a prior knowledge of the orbital altitude. When the orbital altitude is not known then in general three optical channels or modules are required. In this general case where three channels are used for satellite attitude sensing, the processor controlling the sensor can determine the solution to the three-unknown problem and provide satellite orientation in the pitch and roll axes and also altitude. Therefore when orbital altitude is known the effective number of channels is two and more generally when the altitude is not known at least three channels are required. The six channel sensor 20 of FIG. 1 is preferable to provide more data for redundancy, error reduction and further extension of the field of coverage.

Figure 4:
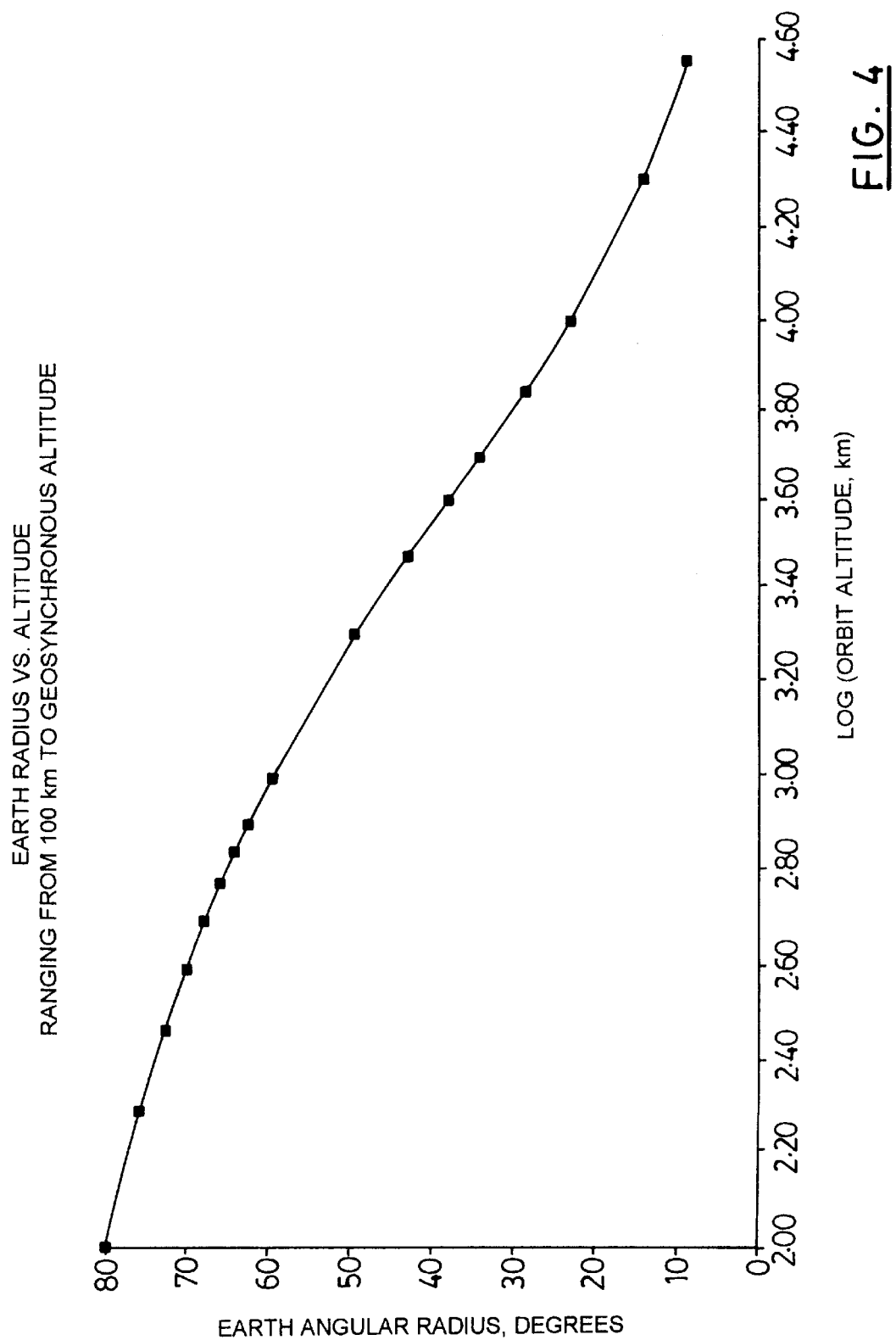
FIG. 4 is a graph of the Earth's angular radius as observed from altitudes from 100 to 40,000 km above the earth which provides the range of orbital altitudes available for a specific field-of-regard of the sensor.

More specifically, sensor 20 comprises six channels (each channel associated with an optical module 30) with a common field-of-regard for all channels and views four fields of view (see FIG. 2) because limb-looking mirror 32 comprises four segments 40 to 46. With axis 24 of the housing pointing toward earth the field-of-regard is about 40 degrees with 4 adjacent fields-of-view of about 10 degrees each. Two fields of view 52 and 54 are shown in FIG. 2 for purposes of illustration. The earth appears from orbit to be a warm body against the cold background of space. Dependent on the orbit altitude, the earth subtends a wide range of angular radii. At low earth orbit (LEO), the earth image appears to be about 160 degrees wide, while in geostationary earth orbit (GEO) the earth is about 17 degrees in diameter. FIG. 4 illustrates the relationship between orbit altitude and the apparent earth angular radius. As depicted in FIG. 4, the field-of-regard may be selected to cover any orbital altitude range within the 40 degrees. For example, for the LEO case, the field-of-regard can be chosen to accommodate the orbital altitude range from 200 to 4000 km by selecting a field of regard which encompasses the angular radius of the earth between 76 and 36 degrees as measured from nadir as seen from the orbiting satellite.

Figure 5:
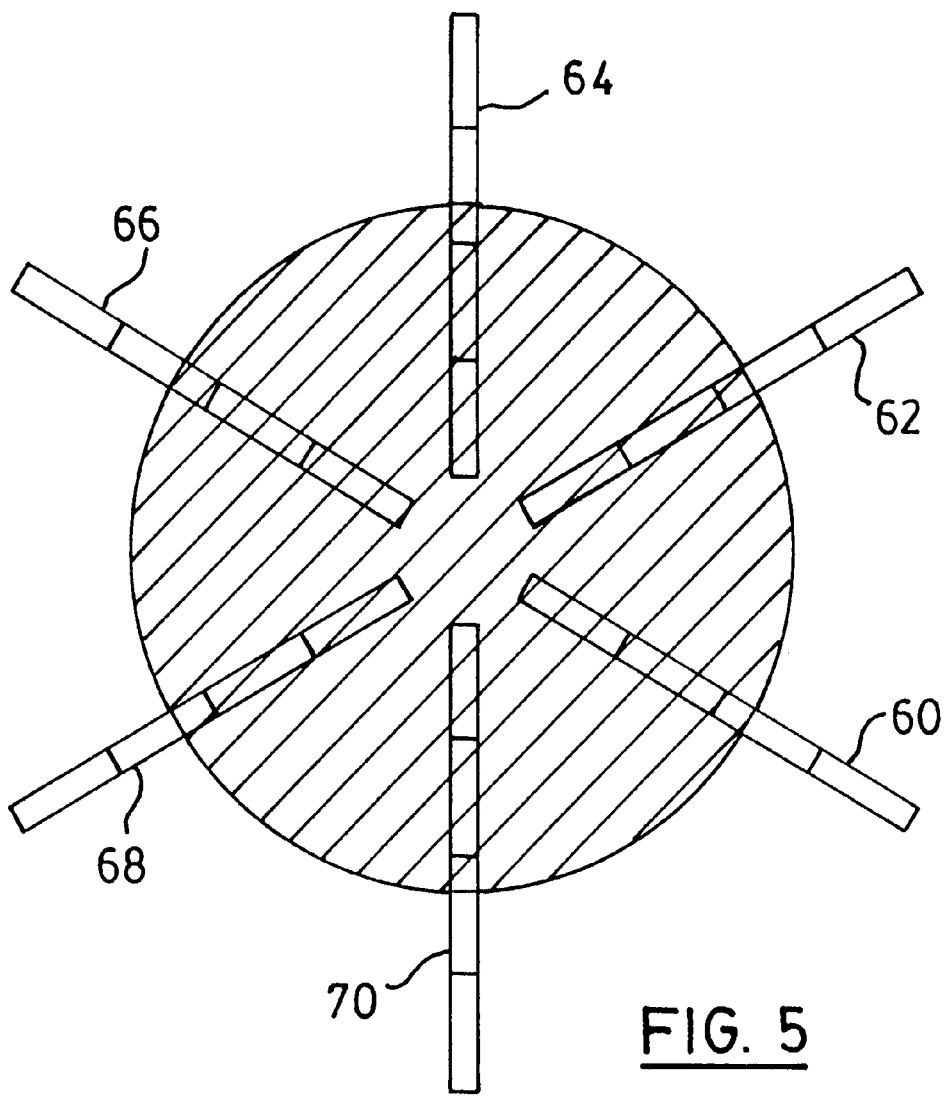
FIG. 5 is an illustration of the field-of-regard and the four fields-of-view with respect to the Earth horizon disk as viewed with the six channel sensor of FIG. 1.

The six channels of sensor 20 are identical in configuration but view six separate radial strips 60, 62, 64, 66, 68 and 70 around the Earth's horizon periphery as illustrated in FIG. 5. Each strip is comprised of four sections representing the individual fields-of-view provided by the four mirror segments 40, 42, 44 and 46 of mirror 32 as shown in FIG. 3b.

The cut-away drawing of the six channel sensor 20 in FIG. 1 shows the relative positioning of the different mirrors 32 and 34. Each optical module 30 is provided with an aperture 80 in the outer wall of housing 22 to allow viewing of the Earth and an aperture 82 in one wall of each channel allows the focused images reflected from mirror 34 to reach detector 36 which is located in the area between each optics module, best seen in FIG. 2.

The angle of the overall limb-looking mirror 32 may be readily changed to accommodate other altitude ranges. Referring to FIG. 3b, only the segmented mirror 32 needs to be modified and this can be achieved by changing the angle β between reflective surface 40 and the base of the mirror which controls the location of the field-of-regard. The individual mirror segments of mirror 32 do not change with respect to each other as they provide the sequential set of fields-of-view for any setting of the field-of-regard location.

Figure 6:
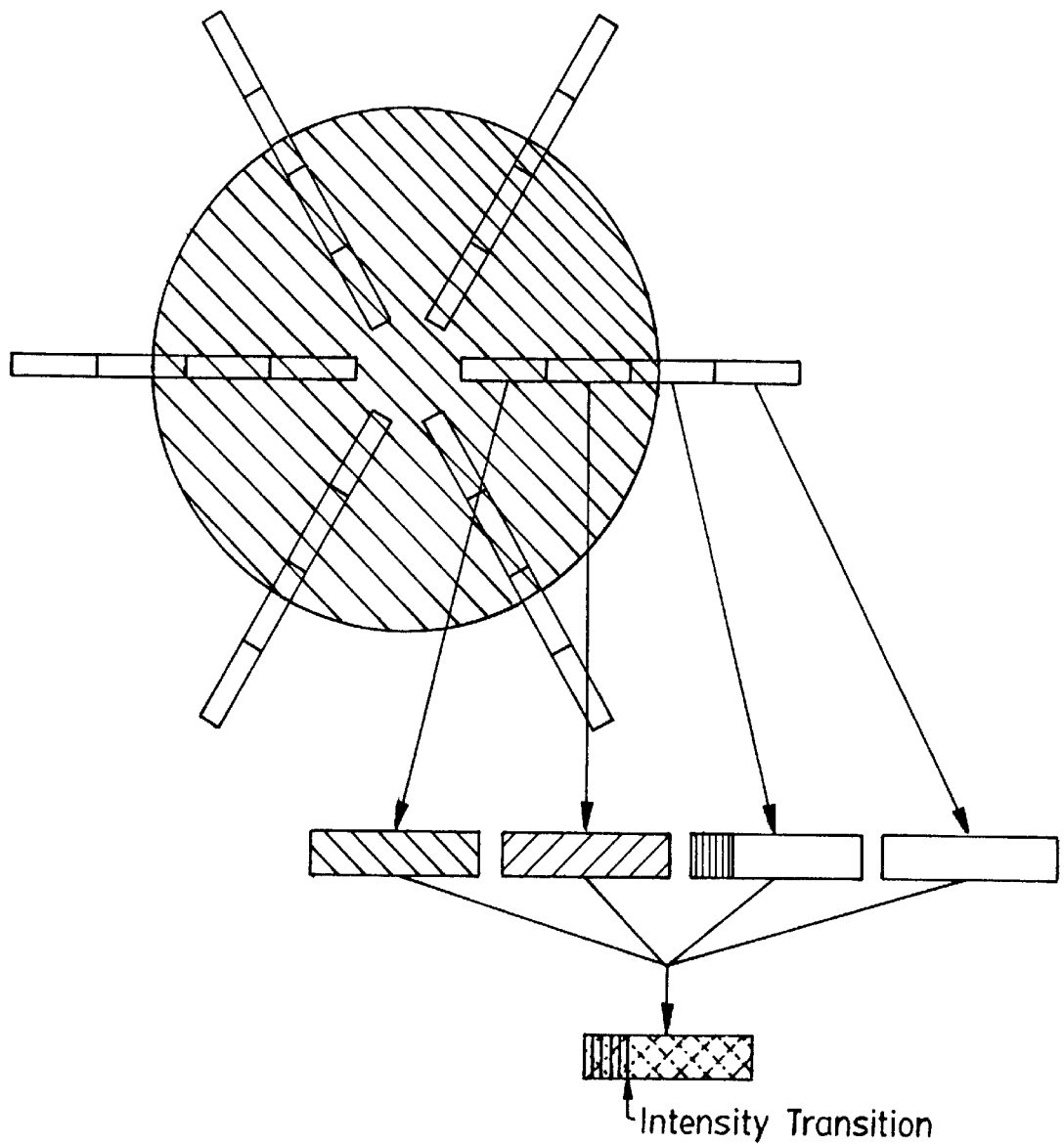
FIG. 6 depicts the overlay concept with the Earth horizon transition occurring within the overlay of the third field-of-view as an example of the net radiometric effect of several image overlays.

The size of the mirror segments 40, 42, 44 and 46 in the limb-looking mirror 32 determines the input aperture of the system. In order to provide reasonable signal-to-noise ratios and to keep the sensor package small, a small number of mirror segments are preferred (four segments are shown in the module of FIGS. 2 and 3b). However, it will be understood that if the size of sensor 20 is increased, the number of mirror segments, their aperture size, or the number of modules 30 may be increased as required. With the images of all four fields-of-view directed to the common detector 36 in each channel, the overlaid images provide a distinct transition point representing the boundary between the warm Earth and cold space. This is illustrated in FIG. 6 which shows the Earth filling two fields-of-view in each channel and partially filling the third. Thus the superposition of these images in an overlay provides a transition in the intensity between radiometric levels corresponding to the radiation from three Earths compared to that from two Earths.

The location of the intensity transition in each channel allows the determination of the angular distance between each horizon point and the optical boresight of sensor 20 coincident with the axis of symmetry 24 in FIG. 2. Knowing these angles for at least two diametrically opposed points allows the calculation of the boresight direction relative to the centre of the Earth. If more than two channels are available, then the more general case can be solved plus orbital altitude can be estimated and/or improved accuracy can be obtained.

Figure 7:
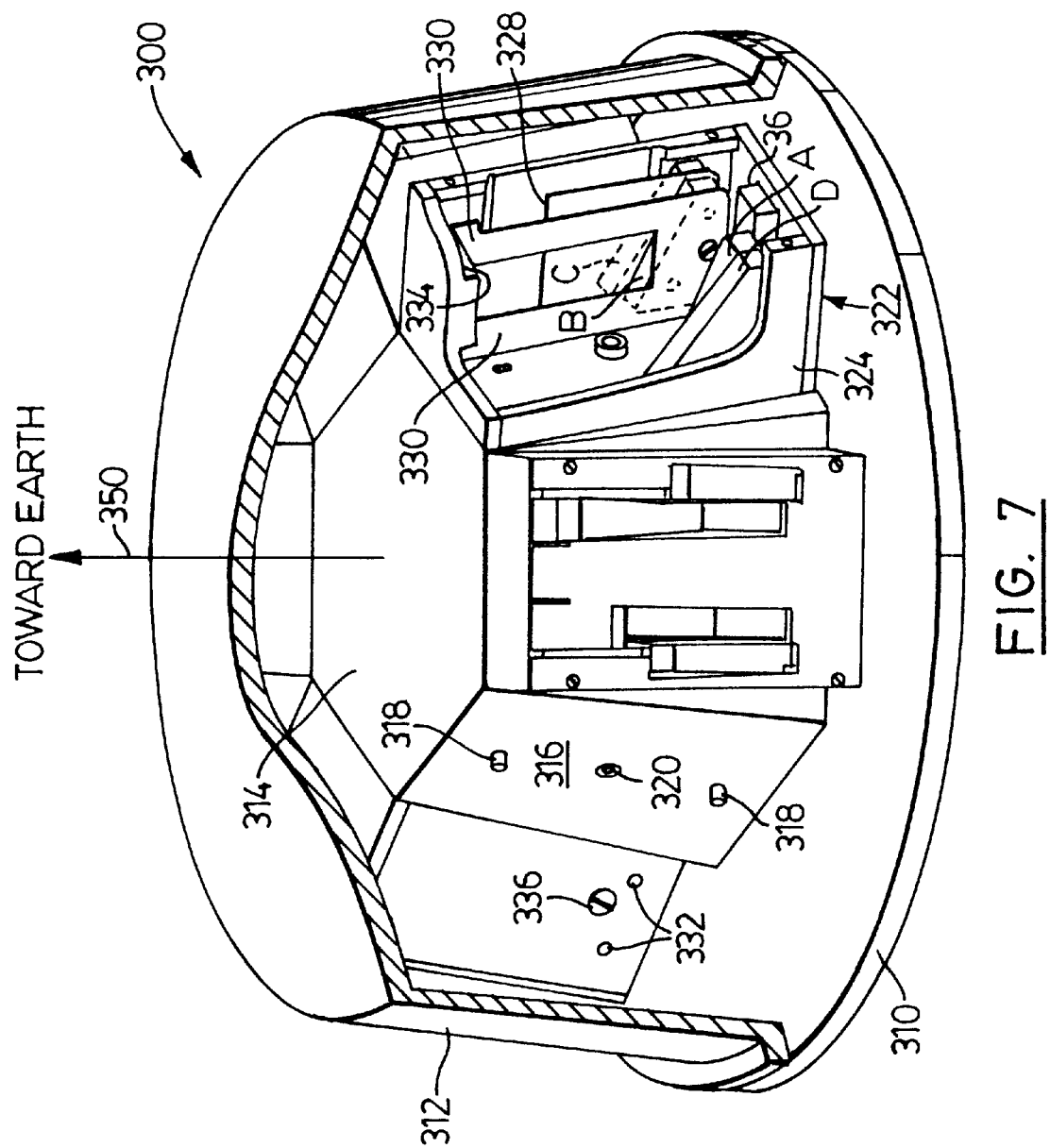
FIG. 7 is a perspective view, broken away, of an alternative embodiment of a satellite attitude sensor (SAS) constructed in accordance with the present invention.
Figure 8:
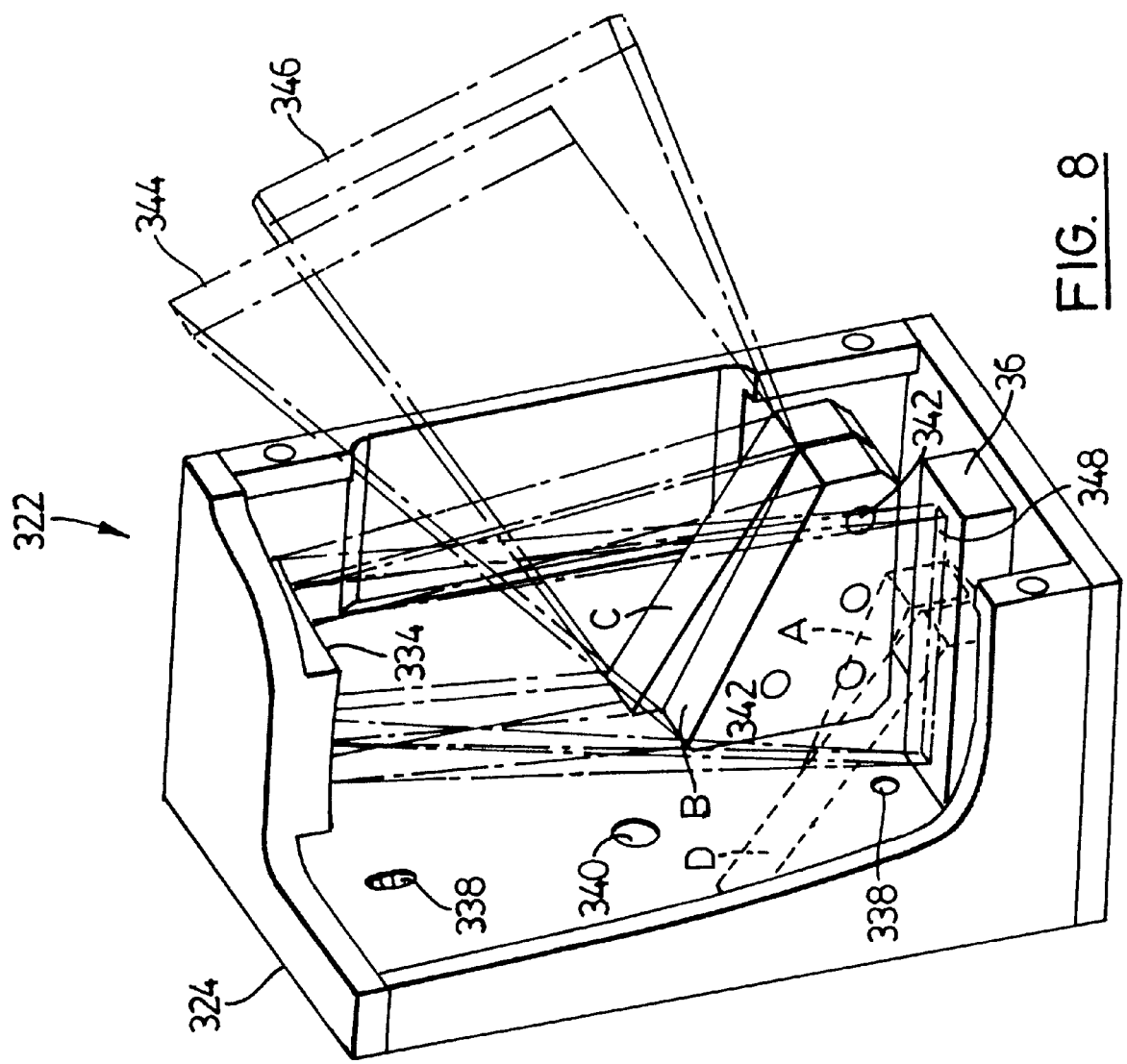
FIG. 8 illustrates the configuration of an optical module used in the satellite attitude sensor of FIG. 7.

FIGS. 7 and 8 illustrate an alternative embodiment of the satellite attitude and orientation sensor constructed in accordance with the present invention. In FIG. 7, shown generally at 300 is a satellite attitude and orientation sensor provided with a sensor housing including a baseplate and satellite interface 310 and a cover 312 to protect the optics during storage and transport. A hexagonally-shaped central support member 314 is rigidly secured to baseplate 310 and includes six planar surfaces 316 each provided with two spaced alignment dowel pins 318 and a threaded hole 320 located between the alignment pins. An optical channel module 322 is adapted to be releasibly secured against each surface 316. Each module 322 comprises a module housing 324 and four mirrors A, B, C and D with mirrors A and D located adjacent to each other and mounted on one side of detector 36 and mirrors B and C mounted on the other side of the detector 36. An outer light baffle 328 and an inner light baffle 330 are located beside mirrors B and C respectively while another pair of similar baffles (not shown) are located next to mirrors A and D. The light baffles serve to prevent stray light from impinging on detector 326 during operation. Each module 322 includes a pair of alignment dowels 332 on one side thereof and a screw 336 for holding the light baffle and mirror subassembly comprising mirrors B and C. Alignment dowels and another screw (not shown) are located on the other side of the housing 324 for the baffle and mirror subassembly comprising mirrors A and D. Each housing 324 includes a single spherical mirror 334 (preferably diamond turned) located under the top portion of the module housing 324.

FIG. 8 is a cut-away of the optical modules 322 showing further details of construction. Housing 324 includes two alignment holes 338 to receive associated dowel pins 318 (FIG. 7) and a central hole 340 through which a mounting screw (not shown) is inserted and screwed into threaded hole 320 (FIG. 7). Two spaced holes 342 in the base of the segmented mirror assembly containing mirrors B and C receive corresponding dowel pins 334 (FIG. 7) for alignment. The other segmented mirror assembly comprising mirrors A and D includes the same holes (not shown). The pixelated detector 36 is integrated onto the microprocessor package 348 adapted to FIG. 8 illustrates two overlapping fields of view 344 and 346 reflected by mirrors B and C respectively onto spherical mirror 334 which then focuses the beams from each field of view onto detector 36 as superimposed images shown as a strip on detector 36. Signals from two other fields of view (not shown) incident on mirrors A and D are focused by the same spherical mirror 334 onto detector 36 so that each optical module 322 superimposes images from four fields of view. The microprocessor 348 on which detector 36 is mounted is capable of providing a spatial sampling of the superimposed images in order to detect intensity transitions from which the position of the boundary between the celestial object and its background is determined.

Referring to FIG. 7, the sensor housing defined by support 314 mounted on base 310 defines an axis 350 about which the optical modules 322 are disposed. It will be appreciated that while the optical module 322 of FIG. 7 and module 30 of FIG. 2 are designed to include preferably four flat mirrors, those skilled in the art will appreciate that the sensor will work with fewer or more than four mirrors and will work with just one mirror. Thus, a sensor with two or more modules each having only one field of view may be used. This minimal number of mirrors and optical channels merely limits the altitude range of operation of the sensor. In addition, the modules required to provide the attitude and orientation information (whether two or three), need not be enclosed in one housing as illustrated for sensors 20 and 300. The optical modules are advantageously very compact so that individual modules may be mounted around the periphery of a satellite structure and inter-connected to provide a distributed sensor function. This type of configuration of distributed modules may be used as an alternative to mounting the modules in a single sensor housing, or, may be used in addition to several modules mounted in a sensor housing.

Each detector 36 is integrated with a microprocessor 348, however, it will be understood that only one microprocessor 348 is required to handle the data from all the detectors. The system may be configured so that all detectors are connected to each of the microprocessors in such a way that only one microprocessor handles all the data but if it malfunctions then another preselected microprocessor assumes control of the signal processing thereby providing comprehensive redundancy in the system.

If the four mirror segments A, B, C and D are replaced by a single flat mirror with an aperture, or alternatively with four mirror segments with the same tilt angle and viewing the same scene, then the four overlays shown in FIG. 6 would be identical. This would provide a four-fold increase in signal strength but the total field of view of the instrument would be reduced by a factor of four (for the same sized mirror). If the earth horizon is within the field of view, the precision of the determination of the horizon position (ie pixel number on the pixelated linear array) could be improved by the increased signal-to-noise ratio. However, if the earth horizon is not within the field of view, no determination of position is possible. The use of four mirror segments viewing the same scene versus the same mirror segments viewing four different scenes, is thus an issue of "capture of the horizon within the field of view" versus improved signal-to-noise ratio. In the application of the satellite attitude sensor, the signal-to-noise ratio is deemed to be acceptable even if only one mirror segment is used. Hence the additional mirror segments can be used to expand the field of view and increase the angular region over which the horizon can be captured.

In the specific application of the satellite attitude sensor, detector 36 (FIGS. 2 and 8) is preferably a pixelated infrared detector for measuring thermal radiation from the earth which is converted to an electronic signal and includes readout electronics. The detectors preferably operate between 4 and 16 microns. The basic resolution of sensor 20 or 300 is dependent on the pixel size of detector 36 and the optical extent of the fields-of-view. For the described implementation, a 256 element (pixel) linear array is assumed matched to a 10 degree field-of-view resulting in about 0.04 degree per pixel. Thus the determination of attitude within 0.05 degrees ($3\sigma$) is achievable. At the lowest altitude of 200 km, the resolution of 0.04 degree represents about 1 km on the horizon which is smaller than the variation expected in the height of the Earth's atmospheric layer when viewed in the wideband thermal infrared region of the spectrum.

The detector used in the present method and apparatus for distinguishing the boundary of an object from its background (such as the earth/space boundary) is capable spatially sampling images focused thereon. The detector comprises an elongate detector surface (in the x-y plane) which can be sampled along its length (x direction) or width (y direction) in order to provide an intensity profile. This ability to sample the intensity in localized areas of the detector facilitates accurate determination of the boundary of the earth against space when the earth/space transition area is imaged onto the detector array.

The detector may comprise a continuous detector surface which can be spatially sampled at discrete points or a plurality of individual detector elements which independently respond to thermal radiation and provide a known spatial sampling of the image. An example of the latter would be an array of photodiodes independently accessed by the control circuitry. The term "pixelated" as used herein refers to this feature of the detector to be able to spatially sample the image focused on the detector and in practice this is preferably achieved using an array of discrete detector.

Figure 9:
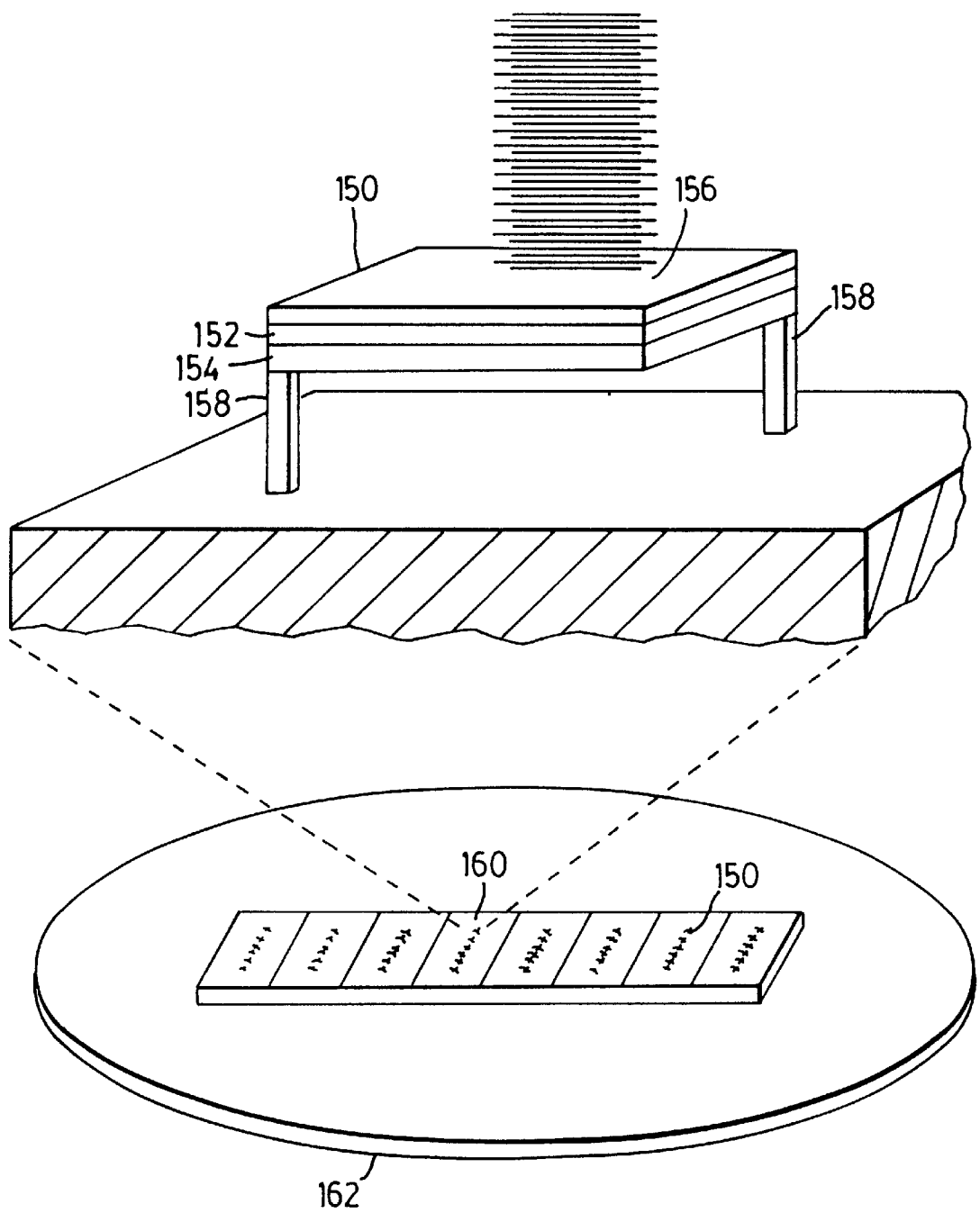
FIG. 9 illustrates a generic microbolometer detector used for detecting thermal radiation in accordance with the present invention.

A preferred uncooled microbolometer for use in the present sensor for detection of thermal radiation is disclosed in a publication by Jerominek et al. "Micromachined, Uncooled, $VO_2$-based, IR Bolometer Arrays", National Optics Institute, presented at SPIE AeroSense, Orlando, Fla., USA, April 1996. FIG. 9 shows the configuration of the uncooled microbolometer comprising an array of free standing microbolometer elements 150 each comprising a $VO_2$ thermometer 152 sandwiched between inner and outer $Si_3N_4$ layers 154 and 156 respectively. Each element is supported on pedestals 158 having low thermal conductance above the detector support 160. The support 160 is mounted on a semiconductor wafer 162 on which the ancillary circuitry is etched.

The detector array may be utilized in a number of aspect ratios, i.e. the ratio of length to width or rows to columns. A linear array has only a few (minimum of only one) column of pixels. A quasi-linear array has a high aspect ratio but a significant number of columns, e.g. 20. Other two-dimensional arrays may have various numbers of rows and columns. The aspect ratio of choice is dependent on the particular sensing application.

The utilization of uncooled microbolometer detectors as disclosed in Jerominek et al. means that no additional cooling equipment is required. Most sensors that use thermal infrared array detectors need to have thermoelectric or cryogenic cooling capability in order to reduce the detector dark current and provide adequate sensitivity. With no moving parts and no thermoelectric or other cooling, the present sensor is able to use its electrical power for processing. The microbolometer detectors are inherently immune from normal radiation expected on orbit. The remainder of the electronics can be made radiation hardened to the appropriate degree.

Figure 10:
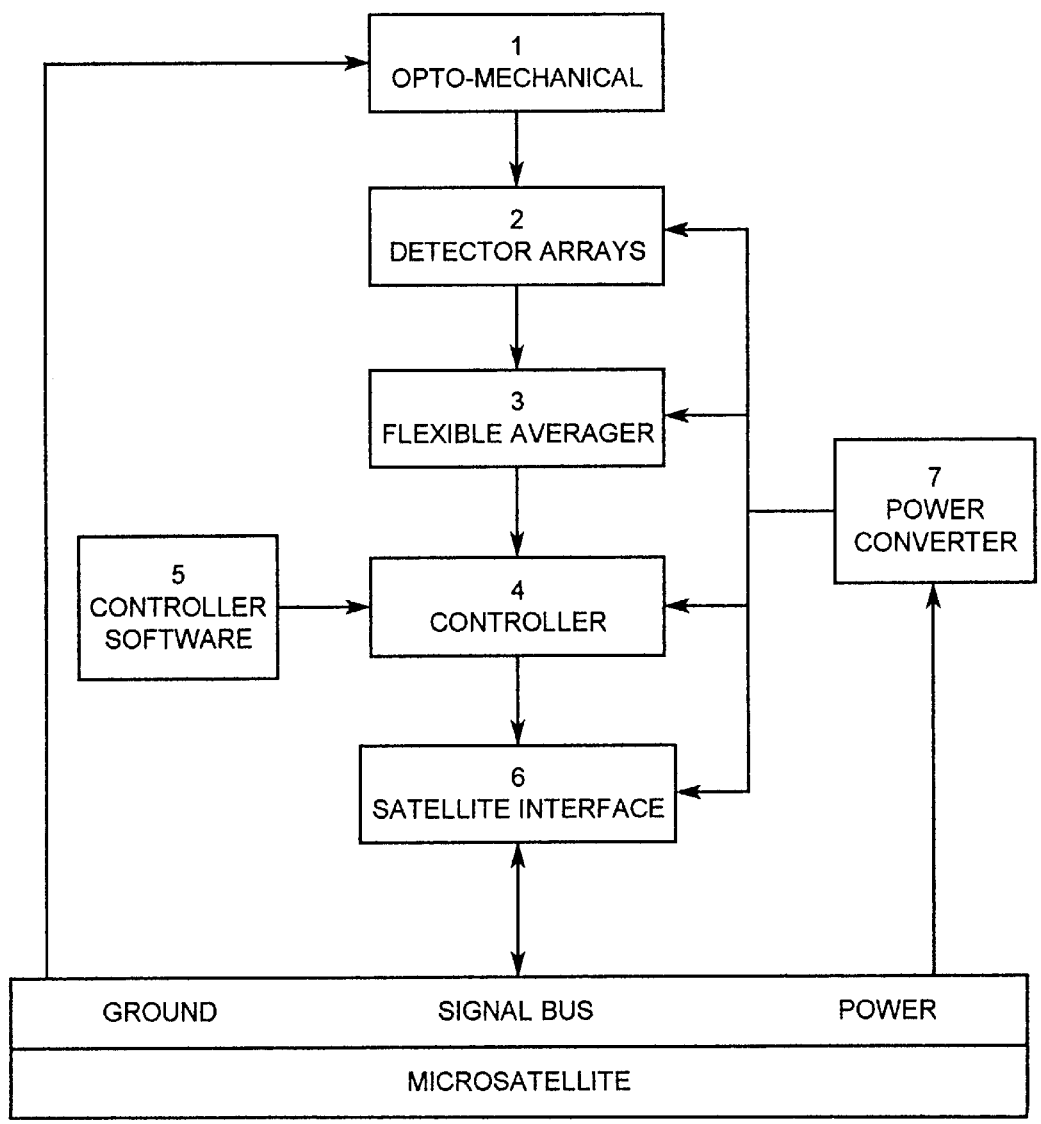
FIG. 10 is a block diagram of the satellite attitude sensor configured for operation on a satellite.

It will be appreciated that the material of construction of the planar and spherical mirrors will depend on the particular wavelength region(s) in which the sensor is designed to operate. For the SAS application in the thermal infrared, unpolished aluminum mirrors can be readily used. Glass or plastic may be used in place of aluminum with evaporated coatings on the optical surfaces. A mixture of different detectors sensitive to different wavelength regions can be used in the different modules to provide multi-spectral imaging, The attitude sensor includes an on-board microprocessor which is interfaced with the main satellite computer and other instrumentation. The mechanical and electrical interfaces are designed for generic applications rather than being specific to a particular satellite bus. The use of active pixel sensors and signal processing circuitry in conjunction with the detectors allows the use of low cost electronics and on-chip processing. FIG. 10 is a block diagram of the satellite attitude sensor. The arrows indicate the direction of flow of information and/or control amongst the various sub-assemblies. The opto-mechanical subsystem interfaces with the detector arrays which provide image data to the flexible averager processing electronics. The controller configures and operates the sensor, performs the final processing steps and interfaces with the satellite.

When used in the SAS application, the sensor disclosed herein is an optical instrument which is used to allow satellites orbiting the earth to determine their pointing error with respect to the earth. This error is used in conjunction with various actuators on board the satellite to maintain the attitude of the satellite in a specified relationship with the earth. The sensor is provided with sufficient processing capability to determine the satellite attitude error with respect to the sensor boresight. This will entail the detection of the earth-space transitions and the fitting of the horizon with appropriate routines. The orbit altitude may also be computed from the data, or, alternatively, the orbit altitude may be provided as an input to further improve the attitude measurement.

The method and device forming the present invention represents a significant improvement on current technology in that only one sensor is required to provide the same, or more information, normally provided by two or more sensors. For example, the sensor may be operated over a wide range of orbit altitudes, potentially from low earth orbit (LEO) to geosynchronous earth orbit (GEO). This represents an altitude variation from about 200 to 36,000 km. No single, current sensor can provide such a range of service. Present sensors are designed to operate at a specific altitude only.

Another feature of the present sensor which makes it superior to current designs is that it can operate in both non-spinning and spinning modes (referring to the method of stabilization of the satellite). Many satellites are spin stabilized and these require spinning earth sensors which allow the determination of the satellite spin axis with respect to the orbital plane and also the azimuth angle between the earth centre and some other reference point on the spinning satellite. In addition to earth sensors, most satellites require spinning sun sensors in order to determine the sun elevation and azimuth angle with respect to the orbit plane and the earth centre. The present satellite attitude sensor can provide all these functions in a single sensor since it can detect the sun as well as the earth. It may also be possible to locate the moon but this is not usually required.

As stated above, the present sensor is capable of providing attitude data in both spinning and staring modes of operation. In the spinning mode this may be achieved by detecting the sun elevation angle with respect to the satellite spin axis and determining the sun's azimuth angle with respect to the centre of the earth. The sun is detectable as a spot several pixels in diameter. At a satellite spin rate of, say 5 rpm, which is 30 degrees/second, and an update rate of the detector of 100 Hz, the satellite rotates 0.3 degrees between updates. Thus, as the sun crosses the field-of-regard of any of the optical channels, at least one readout will contain an image of the sun which can be located within the field-of-regard by the unique properties of the sun, that is, the size and intensity of the distinct spot and its predictable motion and recent history.

Most geosynchronous satellites are launched into a transfer orbit which stretches from LEO to GEO. In this phase, the satellites are normally spin stabilized and carry appropriate sensor equipment to allow the determination of sun and earth position as indicated above. After the apogee motor is fired and the satellite orbit is circularized at geosynchronous altitude, the satellite will be despun and the earth will be acquired using non-spinning earth sensors. This latter acquisition phase of the satellite mission requires careful use of on-board sensors to determine orientation with respect to the sun and earth. The period of time during the despinning of the satellite and the subsequent conversion to three-axis control is critical as the satellite can be readily lost to the ground control if orientation data is misinterpreted or unavailable. In the SAS application, the present invention advantageously provides a very wide field-of-regard which ensures that the earth will appear within at least one of the module fields of view. In addition, the sun may also be tracked when observed moving through the sensors field of view as the satellite rotation rate is slowly brought down to zero revolutions per minute. Thus, the present sensor can effectively replace both sets of equipment with one unit thus saving considerable cost in procurement and launch mass. Launching a mass to GEO is about 10 times more expensive than the cost of launching to LEO.

The sensor disclosed herein has no moving parts, which is another advantage over many current sensor designs that use scanning mirrors or spinning assemblies. The lack of moving parts provides a significant boost in reliability which is of prime concern to both satellite integrators and customers alike since the attitude control subsystem on a satellite is considered one of the most critical systems necessary to mission success. The sensor also has built-in redundancy which allows it to tolerate some failures and provide a graceful degradation in performance.

While the optomechanical design specifically described herein uses reflective optics which advantageously reduces sensor mass, it will be appreciated that refractive optics could be used as an alternative, an example of which will be discussed below with reference to a satellite based wildfire detection system using the overlay principle.

It will be understood that various modifications of the method may be readily made. Examples of various other embodiments include mixing the fields-of-regard amongst the different channels to provide for two or more altitude ranges; using more or less than four fields-of-view within the field-of-regard to allow variation in resolution or angular range; having more or less than six channels to provide redundancy and/or a variety of fields-of-regard as required; monitoring thermal targets other than the Earth, for example, other planets and satellites, or any source of thermal radiation which can be differentiated against its background; using different detectors amongst the different channels which are sensitive in different spectral regions to provide specific discrimination of observed features or targets; use of refractive optics supplying multiple fields-of-view onto a single detector; use of cryogenically cooled or thermoelectrically cooled detectors; using an optical module comprising beamsplitters, including dichroics, to provide multi-image overlays.

For example, detectors may be used which operate in the ultraviolet, visible, near-infrared, short-wave infrared, middle-wave infrared, and long-wave infrared to produce overlay images. The use of any combination of detectors amongst the various channels to provide multi-purpose spectral observations for data fusion applications provides significant configurational flexibility of the system.

Therefore, it will be understood that, more broadly, the present invention provides a method for distinguishing a boundary of an object or the object itself from its background. Specifically, the boundary of an object or the object itself can be differentiated from its background by focussing radiation (in the microwave, infrared, visible, ultraviolet or higher energies) from one or more fields of view substantially spanning the boundary of the object, or the object itself, and background region adjacent to the boundary or the object itself as an image onto the appropriate pixelated detector and then processing the intensity data to correlate spatial transitions in intensity of the image with a boundary of the object or the object itself. The particular wavelength (s) of the electromagnetic radiation being detected will depend on the application at hand. In the case of the satellite attitude sensor disclosed herein it is preferred to detect thermal radiation from the earth/space background since there is a sharp contrast between the thermal signatures of the earth (or other celestial bodies) and vacuum of space. Those skilled in the art will appreciate that the satellite attitude sensor may be used to detect the sun since it emits thermal radiation against the background of space or the moon which reflects solar radiation.

The preferred number of channels (optical modules) and preferred number of fields-of-view in each channel will depend on the particular application at hand. The satellite attitude sensor preferably uses at least three channels (optical modules) to obtain the three quantities of interest while other channels provide redundancy.

An example of an application in which the sensor may be used is for tracking a specific star within a known background of stars using the visible region of the spectrum. The specific star location is monitored and the star field background is used to provide additional information about the satellite attitude with respect to the sensor boresight, namely yaw attitude. More generally, the overlay principle may be applied to existing star tracking instruments used in spacecraft attitude sensors, in order to increase the field of view of the star tracker.

Figure 11:
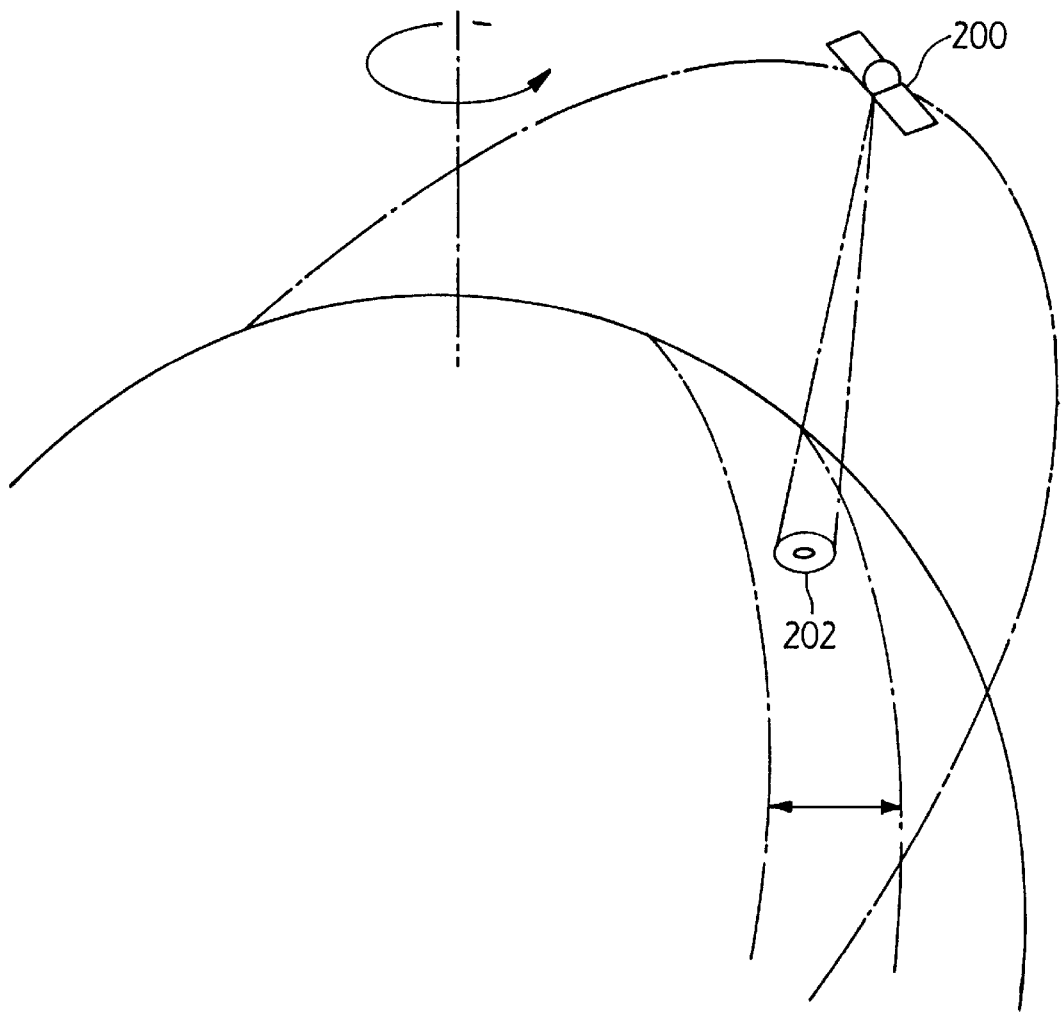
FIG. 11 illustrates the method of the present invention adapted for a satellite-based wildfire detection system.

A specific application of the overlay principle for a satellite based wildfire detection system will be described. FIG. 11 illustrates the method of the present invention for wildfire detection from space. A satellite 200 in near polar low-earth orbit employs an infrared camera with high spatial resolution and two spectral channels to detect a wildfire 202 on the planet. The ratio of the signals from the two spectral channels in a given 'ground footprint' of a detector pixel can be used to create an effective temperature map of the ground that suppresses clutter from artificial objects, sunlight glint and the thermal background.

The satellite-based system for wildfire detection preferably includes a camera system for location of fire 'events', an attitude sensor for georeferencing of the events and an attitude control system to ensure that the camera is pointed approximately in the desired direction. The wildfire detection system preferably requires high spatial resolution on the ground for clutter suppression, but requires only moderate spatial location (on the order of a kilometer or so). Minimal spectral resolution is needed. The baseline concept is to use two spectral channels in the 2–4 micrometer spectral region.

Limitations to the swath, the area on the earth's surface covered by a single orbit, come from the number of pixels in the array detector and the quality of the camera optics. A larger swath increases the coverage per satellite orbit and reduces the number of satellites needed for complete coverage and a short revisit time. There are generally large cost advantages to increasing the swath per satellite. An increase in swath at the expense of spatial resolution is not desirable for the wildfire detection scenario because of scene clutter. Other alternatives for increasing the swath include the incorporation of multiple cameras on each spacecraft and increasing the field of view of each camera. The use of overlaid images for increasing the camera field of view without significant changes to the mass or power requirements of the satellite is a major advantage.

Figure 12:
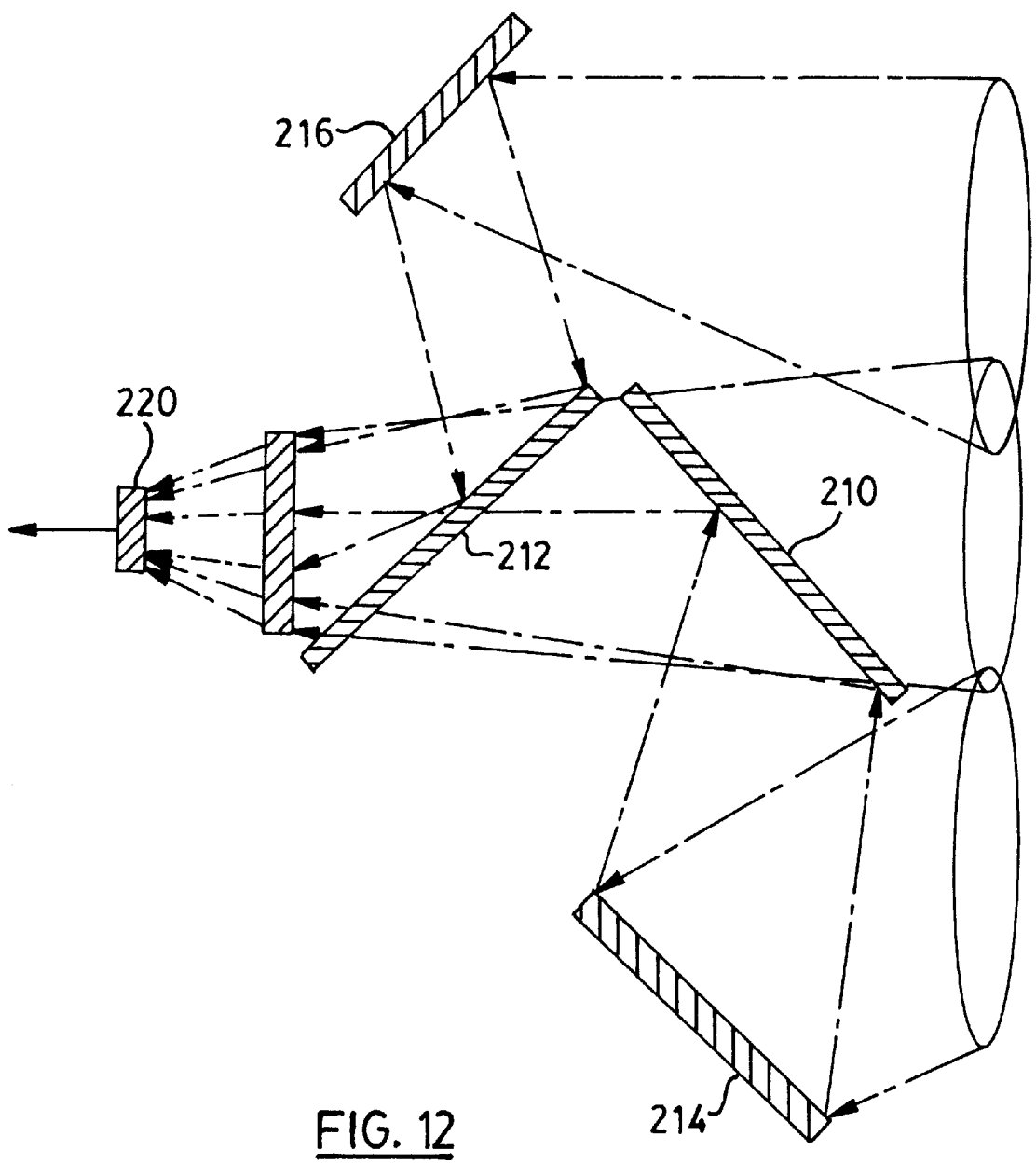
FIG. 12 is a diagrammatic representation of an optical channel which overlays images from three fields-of-view used in the system of FIG. 11.
Figure 13:
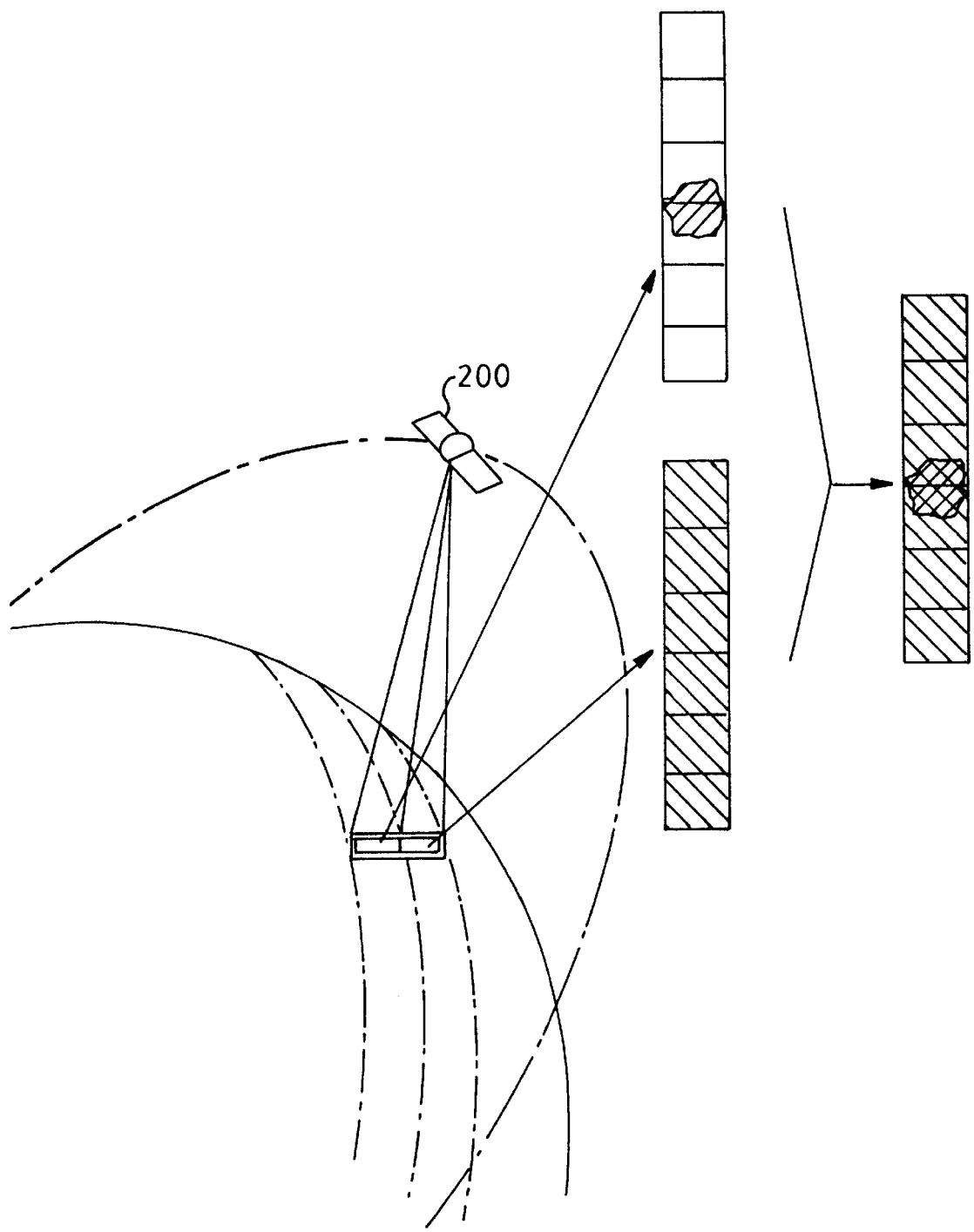
FIG. 13 illustrates overlay of two fields of view in the system of FIG. 11.

For a given camera design, a beamsplitter (or other method of wavefront division) can be used to allow each pixel of the detector array to view multiple points in the field of view. As shown in FIG. 12, the optical module is designed using beamsplitters 210 and 212 and mirrors 214 and 216 to direct images from several (in this case three) fields of view to overlap on the infrared detector array 220. Each detector pixel receives light from three distinct regions. FIG. 13 illustrates the overlay of two images. Features from one region are added to 'background' signals from the second region. Because the spatial signature of an incipient wildfire is distinctive and localized, it can be readily distinguished from the background. There is a 'degeneracy' in the location of an 'event', in the sense that the event could be in any of the regions that are combined by the beamsplitters.

A significant advantage of the overlay approach is an increase in the effective field of view of the camera system without a change in the angular size of the scene viewed by each pixel. Drawbacks include a reduction in signal strength and the degeneracy in the location of the wildfire. The signal strength reduction is approximately proportional to the number of overlays, assuming that the beamsplitter transmittances are correctly chosen and that absorption and second-surface reflections are negligible. Because each detector pixel looks at only a small, number of regions, three in FIG. 10, the degeneracy in the location of an 'event' can often be resolved by the context of the image, by ancillary data or by the signature from spectral coding of the imagery. When events of known location are being monitored, the degeneracy of the image is generally not important unless a new event is masked by the known event. The low probability of a wildfire causes the expectation of such masking to be small. If the density of wildfires is $10^{-4}$/km, then the probability of a masked event can be as low as $10^{-8}$ for a 10 m ground footprint. Changing the wavelength for the various overlays can reduce losses and assist in the removal of the location degeneracy. In addition, a dichroic beamsplitter can act as the spectral selector for the camera system.

It will be understood by those skilled in the art that because the present invention utilizes the principle of overlaid images to differentiate objects, one of the main criteria for application of this technique is that the target should be distinct against the background. Therefore, the present method may be used as long as the background is relatively uniform or well known and the scene is changing slowly with respect to the detector sampling rate. Some other examples of possible applications in the various spectral regions are as follows: visible star tracker locked on a specific star against a known background of stars; surveillance and tracking of ships at sea; a thermal infrared sensor for detection and tracking of spacecraft and/or human workers in the vicinity of a space station.

While the method of the present invention has been described and illustrated with respect to the preferred and alternative embodiments, it will be appreciated by those skilled in the art that numerous variations of these embodiments may be made without departing from the scope of the invention disclosed herein.

Therefore what is claimed is:

1. A method for distinguishing a boundary of a celestial object from background of space using a sensor mounted on a satellite, comprising:

a) focusing electromagnetic radiation from at least one field of view of about 10 degrees, said field of view substantially spanning at least a portion of a boundary of an object and background adjacent to said at least a portion of said boundary as an image onto a detection means, the detection means including a microbolometer having an elongate array of microbolometer elements capable of providing spatial sampling of an image focussed thereon; and b) determining a boundary of an object from its background from a spatial transition in intensity of an image focussed on said detection means.

2. The method according to claim 1 wherein the step of focusing the image from at least one field of view includes superimposing images from at least two fields of view.

3. The method according to claim 2 wherein the step of focusing said images comprises refractively focusing said images from said at least two fields of view onto said detection means.

4. The method according to claim 1 wherein the sensor means includes at least one mirror, and wherein the step of focussing said image from said at least one field of view onto said detection means includes reflecting the image from the least one mirror onto a focussing mirror that focuses said image onto said detection means.

5. A device for distinguishing a boundary of an object from its background, comprising:

a housing;

detection means mounted in said housing for detecting electromagnetic radiation, said detection means including a microbotometer having an elongate array of microbolometer elements for spatial sampling of images focused thereon;

optical focusing means mounted in said housing for focusing electromagnetic radiation from at least one field of view as an image onto said detection means; and processing means connected to said detection means for correlating a spatial transition in intensity of an image focused on said detection means with a boundary of an object, wherein said processing means includes a semiconductor chip integrated with said detection means for processing of the output of the detection means.

6. The device according to claim 5 wherein said optical focusing means includes a first substantially flat mirror mounted in said housing for collecting electromagnetic radiation from at least one field of view, and a focusing mirror for focusing said image onto said detection means.

7. The device according to claim 6 wherein said optical focusing means comprises a segmented mirror provided with said first substantially flat mirror and at least a second substantially flat mirror segment disposed at a preselected angle with respect to said first substantially flat mirror segment for collecting electromagnetic radiation from at least two fields of view, and wherein said focusing mirror superimposes images from each mirror segment onto said detection means.

8. The device according to claim 7 wherein said segmented mirror and said housing is a module housing, said module housing being releasibly attachable to a sensor housing.

9. The device according to claim 8 including a plurality of module housing releasibly attached to said sensor housing, and wherein said sensor housing is releasibly attached to a satellite.

10. A device for determining satellite orientation and attitude with respect to a celestial body, comprising:
an effective number of optical modules adapted to be attached to a satellite in preselected positions with respect to each other, each optical module including a detection means adapted to spatially sample an image focused thereon, a segmented mirror having at least one mirror segment, and focusing mirror means located with respect to said segmented mirror for receiving images reflected from said at least one mirror segment and focussing said image onto said detection means; and
processing means connected to said detection means, said processing means adapted to correlate spatial transitions in intensity of said image focused on said detection means with a boundary of the celestial body and determining therefrom satellite attitude with respect to the celestial body.

11. The device according to claim 10 wherein said segmented mirror includes n mirror segments disposed at a preselected angle with respect to one another, wherein n is an integer greater than or equal to 2, and wherein said focusing mirror means is adapted to superimpose images from each of said mirror segments onto said pixelated detection means.

12. The device according to claim 11 wherein said effective number of optical modules is at least two optical modules, and wherein said optical modules are releasibly attachable to a satellite structure.

13. The device according to claim 12 wherein said detection means is a pixelated detection means. releasibly attachable to a satellite structure.

14. The device according to claim 13 wherein said pixelated detection means is a pixelated thermal detector.

15. The device according to claim 13 wherein said optical modules are releasibly attachable to a sensor housing, and wherein said sensor housing is adapted to be attached to a satellite housing.

16. The device according to claim 15 wherein said sensor housing defines an axis, and a plurality of said optical modules disposed about said axis in said sensor housing.

17. The device according to claim 16 wherein said plurality of optical modules is six optical modules.

18. The device according to claim 13 wherein said preselected angle between each mirror segment is in the range from about 1 degree to about 15 degrees.

19. The device according to claim 18 wherein n equals 4 mirror segments.

20. The device according to claim 19 wherein said preselected angle between each mirror segment is about 2.5 degrees.

21. The device according to claim 14 wherein said pixelated thermal detector comprises a plurality of microbolometer detector elements forming an array on a detector support member.

22. The device according to claim 21 wherein said processing means comprises a semiconductor chip, and said detector support member in each module being mounted on an associated semiconductor chip.

23. The device according to claim 22 wherein the processing means in each module is connected to the processing means in the other modules, and wherein each processing means is adapted to receive and process data from the detection means in each optical module.

24. A device for determining orientation and attitude of a satellite with respect to a celestial body, comprising:
an effective number of modules adapted to be attached to a satellite in preselected positions with respect to each other, each optical module including pixelated detection means, optical focusing means mounted in each module for collecting and focusing electromagnetic radiation from at least one field of view onto said pixelated detection means, said optical focusing means including a segmented mirror having n mirror segments each disposed at preselected angles with respect to one another, wherein n is an integer greater than or equal to 2, and a focusing mirror means for superimposing images from each of said mirror segments onto said pixelated detection means; and
processing means connected to said pixelated detection means for correlating a spatial transition in intensity of said image with a boundary of said celestial object and determining therefrom satellite attitude and/or orientation with respect to the celestial body.

25. The device according to claim 24 wherein said preselected angle between each mirror segment is in the range from about 1 degree to about 15 degrees.

26. The device according to claim 24 wherein said optical modules are releasibly attachable to a satellite structure.

27. The device according to claim 24 wherein said optical modules are releasibly attachable to a sensor housing, and wherein said sensor housing is adapted to be attached to a satellite structure.

28. The device according to claim 24 wherein said pixelated detection means is a pixelated thermal detector.

29. The device according to claim 28 wherein said pixelated thermal detector comprises a plurality of microbolometer detector elements forming an array on a detector support member.

30. The device according to claim 29 wherein said processing means comprises a semiconductor chip, and said detector support member in each module being mounted on an associated semiconductor chip.

31. The device according to claim 30 wherein the processing means in each module is connected to the processing means in the other modules, and wherein each processing means is adapted to receive and process data from the detection means in each optical module.

32. A satellite having a satellite structure and an equipment complement, comprising:
an orientation and attitude sensor for determining satellite orientation and attitude of said satellite with respect to a celestial body, said sensor including;
an effective number of optical modules adapted to be attached to said satellite structure in preselected positions with respect to each other, each optical module including pixelated detection means, optical focusing means mounted in said module for collecting and focusing electromagnetic radiation from at least one field of view as an image onto said pixelated detection means, said optical focusing means including a segmented mirror having n mirror segments each disposed at preselected angles with respect to one another, wherein n is an integer greater than or equal to 2, and a focusing mirror means for superimposing images from each of said mirror segments onto said pixelated detection means; and processing means connected to said pixelated detection means for correlating a spatial transition in intensity of said image with a boundary of said celestial object and determining therefrom satellite attitude and/or orientation with respect to the celestial body.

33. The satellite according to claim 32 wherein said preselected angle between each mirror segment is in the range from about 1 degree to about 15 degrees.

34. The satellite according to claim 32 wherein said optical modules are releasibly attachable to a sensor housing, and wherein said sensor housing is adapted to be attached to said satellite structure.

35. The satellite according to claim 32 wherein said pixelated detection means is a pixelated infrared detector.

36. A satellite sensor device for detecting fires on the earth, comprising:
   a sensor housing;
   a pixelated infrared detector mounted in said housing for detecting infrared electromagnetic radiation characteristic of fires;
   optical focusing means mounted in said sensor housing for superimposing images from at least two fields of view of the earth's surface as overlaid images onto said infrared detector; and
   means for correlating a spatial transition in intensity of said overlaid images on said infrared detector with a boundary of a region emitting infrared radiation characteristic of fires.

37. The device according to claim 36 wherein said pixelated infrared detector is a short-wave infrared detector sensitive to the spectral range of from about 1.4 microns to about 4 microns.

38. The method according to claim 2 wherein the sensor means includes at least two mirrors, and wherein the step of superimposing said images from said at least two fields of view onto said detection means includes reflecting the images from the at least two mirrors onto a focussing mirror that focuses said images onto said detection means, wherein each mirror is disposed at preselected angles with respect to the other mirrors.

39. The device according to claim 11 wherein said effective number of optical modules is at least three optical modules, and wherein said optical modules are releasibly attachable to a satellite structure.

* * * * *